United States Patent
Zheng et al.

(10) Patent No.: US 11,683,590 B2
(45) Date of Patent: Jun. 20, 2023

(54) IMAGE APPARATUS AND MOBILE TERMINAL

(71) Applicant: VIVO MOBILE COMMUNICATION CO., LTD., Guangdong (CN)

(72) Inventors: Yanchang Zheng, Guangdong (CN); Wei Gui, Guangdong (CN); Chunxiong Wu, Guangdong (CN); Heng Zhang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 264 days.

(21) Appl. No.: 17/148,973

(22) Filed: Jan. 14, 2021

(65) Prior Publication Data

US 2022/0368834 A1 Nov. 17, 2022
US 2023/0069815 A9 Mar. 2, 2023

Related U.S. Application Data

(63) Continuation of application No. PCT/CN2019/095363, filed on Jul. 10, 2019.

(51) Int. Cl.
*H04N 23/695* (2023.01)
*H04N 23/51* (2023.01)

(52) U.S. Cl.
CPC ........... *H04N 23/695* (2023.01); *H04N 23/51* (2023.01)

(58) Field of Classification Search
CPC ...... F16M 11/046; F16M 11/08; F16M 11/18; G03B 17/04; G03B 30/00; H04M 1/0264;

(Continued)

(56) References Cited

U.S. PATENT DOCUMENTS

2007/0009247 A1* 1/2007 Maeda ................ G02B 13/009
348/E5.025
2007/0036538 A1* 2/2007 Cho ...................... G03B 17/04
396/349

(Continued)

FOREIGN PATENT DOCUMENTS

CN 103533222 A 1/2014
CN 105872339 A 8/2016

(Continued)

OTHER PUBLICATIONS

ISR and Written Opinion received for PCT Application No. PCT/CN2019/095363, dated Jan. 28, 2021, 9 pages and 6 pages of English Translation.

(Continued)

*Primary Examiner* — Amy R Hsu
(74) *Attorney, Agent, or Firm* — Brooks Kushman P.C.

(57) ABSTRACT

Provided in the present disclosure are a camera apparatus and a mobile terminal. The camera apparatus of the present disclosure comprises: a camera assembly; a rotary shaft that is fixedly connected to the camera assembly, a first gear being fixed at an end of the rotary shaft that is away from the camera assembly; a transmission component that is fixed on the rotary shaft and that abuts against the camera assembly; a screw rod that is rotationally connected to the transmission component, a second gear being fixed on the screw rod, and the screw rod and the rotary shaft being arranged in parallel; and a control structure that is connected to the screw rod, the control structure driving the screw rod to rotate, and the screw rod rotatingly driving the transmission component to move along the central axis of the rotary shaft.

18 Claims, 5 Drawing Sheets

(58) Field of Classification Search
CPC ... H04M 2250/20; H04N 23/50; H04N 23/51; H04N 23/695
See application file for complete search history.

(56) References Cited

U.S. PATENT DOCUMENTS

| | | | |
|---|---|---|---|
| 2008/0226283 A1* | 9/2008 | Yu | F16M 11/2071 396/428 |
| 2009/0002645 A1* | 1/2009 | Lee | G03B 3/00 353/101 |
| 2016/0070154 A1 | 3/2016 | Lai | |
| 2020/0363387 A1* | 11/2020 | Zhang | G01N 33/246 |
| 2022/0078313 A1* | 3/2022 | Xia | H04M 1/0264 |

FOREIGN PATENT DOCUMENTS

| | | |
|---|---|---|
| CN | 106254581 A | 12/2016 |
| CN | 106911883 A | 6/2017 |
| CN | 207011146 U | 2/2018 |
| CN | 107872609 A | 4/2018 |
| CN | 108600596 A | 9/2018 |
| CN | 105611148 A | 12/2018 |

OTHER PUBLICATIONS

Office Action Received for CN Patent Application No. 201810776014.0 dated Oct. 14, 2019, 7 pages and 7 pages of English Translation.
Office Action Received for CN Patent Application No. 201810776014.0 dated Jul. 29, 2019, 6 pages and 5 pages of English Translation.

\* cited by examiner

IMAGE APPARATUS AND MOBILE TERMINAL

CROSS REFERENCE TO RELATED APPLICATIONS

This application is continuation application of PCT International Application No. PCT/CN2019/095363 filed on Jul. 10, 2019, which claims priority to Chinese Patent Application No. 201810776014.0, filed in China on Jul. 16, 2018, the disclosures of which are incorporated in their entireties by reference herein.

TECHNICAL FIELD

This disclosure relates to the field of camera technologies, and in particular, to a camera apparatus and a mobile terminal.

BACKGROUND

Artificial intelligence (AI) is about to become a forefront field of the next wave of technologies, and implementation of artificial intelligence technologies strongly relies on implementation of a higher level of human-computer interaction. Image and video interaction represented by cameras has occupied a main position. A camera solution of a mobile phone in the related art includes a front camera and a rear camera, and they are both placed above (occasionally placed below) a display area of a screen. In order to better implement image and video human-computer interaction, various mobile phone manufacturers continuously improve a quantity of camera pixels in one aspect, and continuously increase a quantity of cameras in another aspect, and even a three-camera or four-camera solution has emerged. With the development of full-screen mobile phones, sizes of upper and lower black borders have been further compressed, and the front camera has become a bottleneck in design of a whole machine while a size of the whole machine remains unchanged. In the related art, although there is a camera that can be ejected from a terminal and used under an operation of a user to rotate a shooting direction, manual rotation of the camera is required, which increases the operation of the user.

SUMMARY

The objective of this disclosure is to provide a camera apparatus and a mobile terminal.

Embodiments of this disclosure are implemented as follows:

According to a first aspect, an embodiment of this disclosure provides a camera apparatus, including:

a camera module;

a rotating shaft fixedly connected to the camera module, where a first gear is fixed at one end, away from the camera module, of the rotating shaft;

a transmission component fixed on the rotating shaft and abutting against the camera module;

a screw rod rotatably connected to the transmission component, where a second gear is fixed on the screw rod, and the screw rod is arranged in parallel with the rotating shaft; and a control mechanism connected to the screw rod, where the control mechanism drives the screw rod to rotate, the screw rod rotates to drive the transmission component to move in a central axis direction of the rotating shaft, and when the transmission component moves to a predetermined position, the first gear meshes with the second gear to drive the camera module to rotate.

According to a second aspect, an embodiment of this disclosure provides a terminal, where a housing of the terminal is provided with an accommodating space, the terminal further includes the camera apparatus as describe above, and the camera apparatus is arranged in the accommodating space.

The embodiments of this disclosure have the following beneficial effects:

According to the camera apparatus in the embodiments of this disclosure, the control mechanism drives the screw rod to rotate, and when the screw rod rotates, the transmission component is driven to move in the central axis direction of the screw rod, so that the camera module can protrude from the terminal. In addition, the screw rod rotates to drive the transmission component to move in the central axis direction of the rotating shaft, and when the transmission component moves to the predetermined position, the first gear meshes with the second gear to drive the camera module to rotate, so that the camera module can automatically rotate after protruding from the terminal.

BRIEF DESCRIPTION OF DRAWINGS

To describe the technical solutions in the embodiments of this disclosure more clearly, the following briefly describes the accompanying drawings for describing the embodiments of this disclosure. Apparently, the accompanying drawings in the following description show merely some embodiments of this disclosure, and persons of ordinary skill in the art may derive other drawings from these accompanying drawings without creative efforts.

DESCRIPTION OF EMBODIMENTS

The following clearly and completely describes the technical solutions in the embodiments of this disclosure with reference to the accompanying drawings in the embodiments of this disclosure. Apparently, the described embodiments are merely some but not all of the embodiments of this disclosure. All other embodiments obtained by a person of ordinary skill in the art based on the embodiments of this disclosure without creative efforts shall fall within the protection scope of this disclosure.

Figure 1:
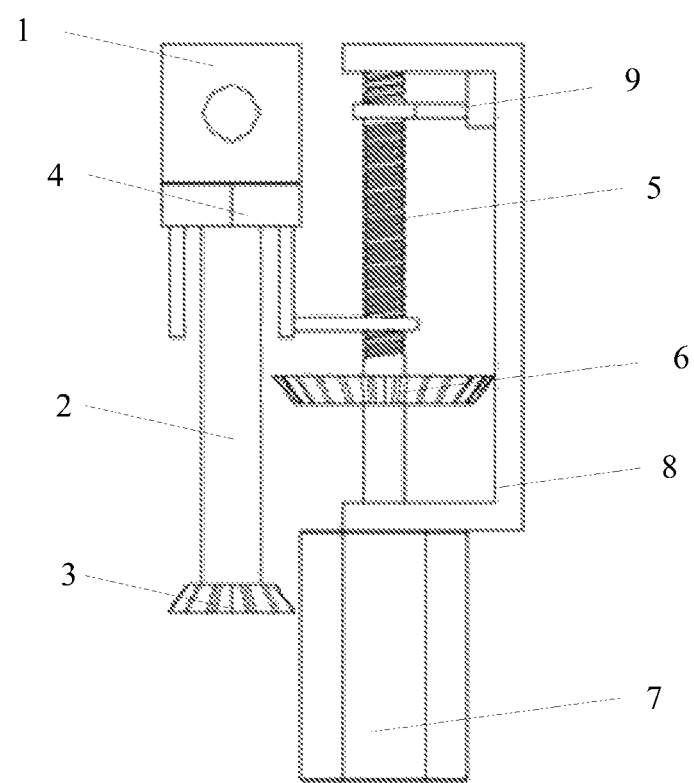
FIG. 1 is a first schematic structural diagram of a camera apparatus according to an embodiment of this disclosure.
Figure 2:
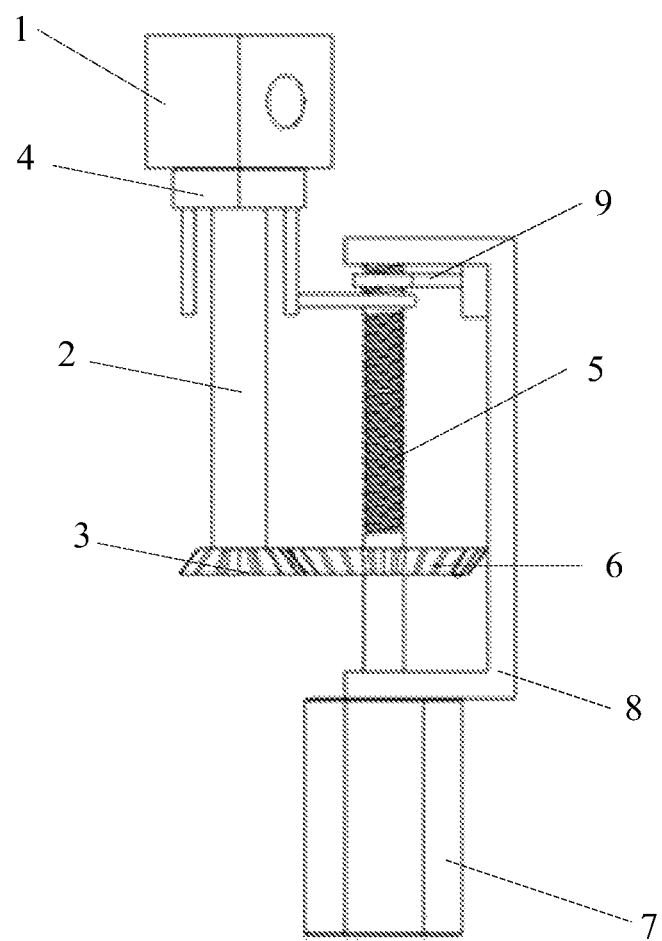
FIG. 2 is a second schematic structural diagram of a camera apparatus according to an embodiment of this disclosure.

An embodiment of this disclosure provides a camera apparatus, applied to a terminal. The terminal may be specifically a smartphone, a tablet computer (PAD), a personal computer, or the like. As shown in FIG. 1 and FIG. 2, the camera apparatus includes:

a camera module 1;

a rotating shaft 2 fixedly connected to the camera module 1, where a first gear 3 is fixed at one end, away from the camera module 1, of the rotating shaft 2;

a transmission component 4 fixed on the rotating shaft 2 and abutting against the camera module 1;

a screw rod 5 rotatably connected to the transmission component 4, where a second gear 6 is fixed on the screw rod 5, and the screw rod 5 is arranged in parallel with the rotating shaft 2; and a control mechanism 7 connected to the screw rod 5, where the control mechanism 7 drives the screw rod 5 to rotate, the control mechanism 7 includes a motor and a decelerator, the screw rod 5 rotates to drive the transmission component 4 to move in a central axis direction of the rotating shaft 2, and when the transmission component 4 moves to a predetermined position, the first gear 3 meshes with the second gear 6 to drive the camera module 1 to rotate.

Specifically, the first gear 3 is located below the second gear 6, and a distance between the rotating shaft 2 and the screw rod 5 is smaller than a sum of radii of the first gear 3 and the second gear 6, so that the first gear 3 and the second gear 6 are on a same plane, and they can be meshed with each other, to drive the first gear by the second gear to rotate and further to drive the camera module 1 to rotate.

In a specific embodiment of this disclosure, the control mechanism 7 controls the transmission component 4 through the screw rod 5 to move in a first direction, and when the transmission component 4 moves in the first direction, the camera module 1 and the rotating shaft 2 are driven to move in the first direction. When one end of the transmission component 4 moves to a predetermined area of the screw rod 5, the first gear 3 meshes with the second gear 6 to drive the rotating shaft 2 to rotate. When the rotating shaft 2 rotates, the camera module 1 is driven to rotate. The first direction is parallel to the central axis direction of the screw rod 5. For example, moving in the first direction may be specifically moving upward in the central axis direction of the screw rod.

The control mechanism 7 may also control the transmission component 4 through the screw rod 5 to move in a second direction opposite to the first direction. When the transmission component 4 moves in the second direction, the camera module 1 and the rotating shaft 2 are driven to move in the second direction, the first gear 3 is separated from the second gear 6, the rotating shaft 2 stops rotating. When the rotating shaft 2 stops rotating, the camera module 1 stops rotating.

In addition, a maximum rotation angle of the foregoing camera module is 360 degrees, that is, the first gear 3 rotates once.

According to the camera apparatus in the embodiment of this disclosure, the control mechanism drives the screw rod to rotate, and when the screw rod rotates, the transmission component is driven to move in the central axis direction of the screw rod, so that the camera module can protrude from the terminal. In addition, the screw rod rotates to drive the transmission component to move in the central axis direction of the rotating shaft, and when the transmission component moves to the predetermined position, the first gear meshes with the second gear to drive the camera module to rotate, so that the camera module can automatically rotate after protruding from the terminal.

In addition, in the camera apparatus in the embodiment of this disclosure, the camera module is telescopic and compatible with design of a full-screen mobile phone. Through rotation, the camera module can implement functions of front and rear cameras, saving a quantity of devices, further reducing device costs, and also saving stacking space of a whole machine. In addition, a panoramic shooting function can be implemented through control of an angular velocity of the rotating shaft.

Figure 3:
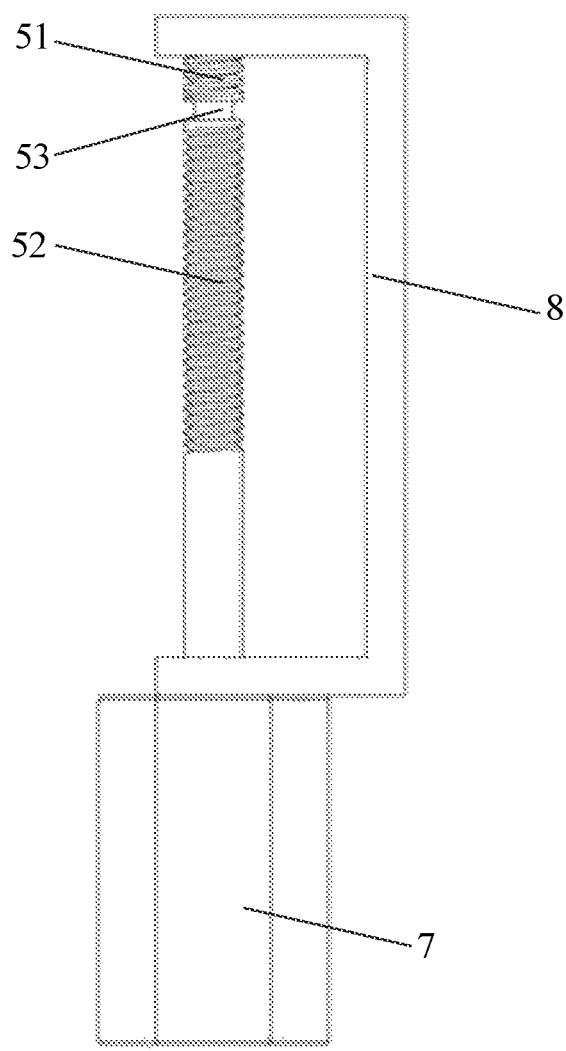
FIG. 3 is a schematic structural diagram of a screw rod in a camera apparatus according to an embodiment of this disclosure.

Further, as shown in FIG. 3, the screw rod 5 includes:

a first part 51, a second part 52, and a limiting part 53 located between the first part 51 and the second part 52.

The first part 51 and the second part 52 each are a rod-shaped structure with threads on its surface, and the limiting part 53 is a rod-shaped structure without threads on its surface. In addition, a diameter of the limiting part 53 is smaller than a diameter of the first part 51 and a diameter the second part 52, and the foregoing predetermined area is an area to which the limiting part 53 corresponds in the screw rod 5.

Because an outer surface of the limiting part 53 does not have threads, when one end of the transmission component 4 moves to the limiting part 53, this end of the transmission component stays at this position and does not move up or down. That the transmission component 4 moves to the predetermined position means that one end of the transmission component moves to the limiting part.

Based on this, the camera apparatus in the embodiment of this disclosure further includes:

a frame 8 fixedly connected to the screw rod 5, where a limiting component 9 is arranged on the frame 8, and the limiting component 9 is clamped on the limiting part 53.

As shown in FIG. 1 and FIG. 2, the frame 8 is formed by connecting two horizontal plates and a vertical plate. The two horizontal plates are located at both ends of the vertical plate, one horizontal plate is connected to a first end of the screw rod, and the other horizontal plate is connected to a second end of the screw rod.

Figure 4:
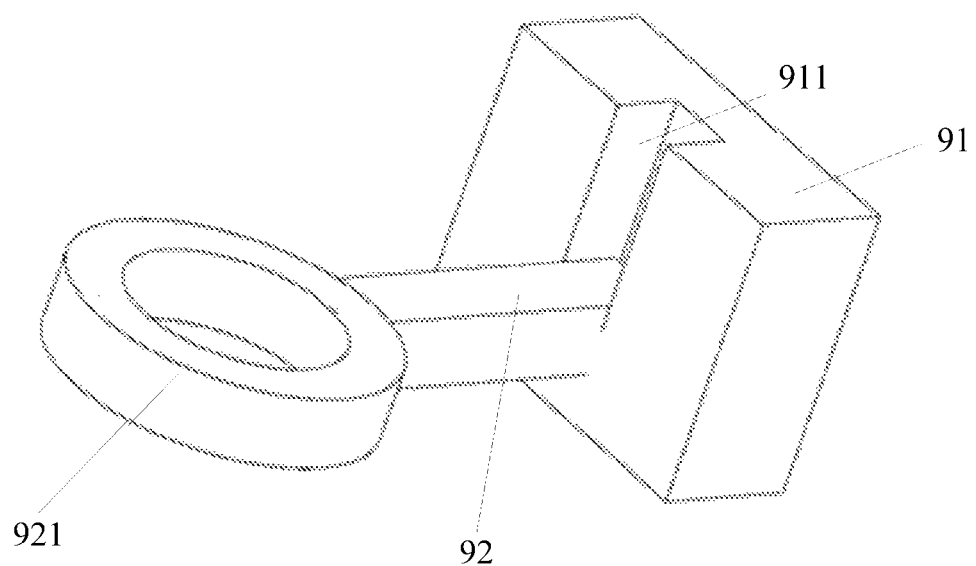
FIG. 4 is a schematic structural diagram of a limiting component in a camera apparatus according to an embodiment of this disclosure.

As shown in FIG. 4, the limiting component 9 includes a limiting block 91 and a limiting plate 92.

The limiting block 91 is fixedly connected to the frame 8. Specifically, the limiting block 91 is fastened to the vertical plate, and a sliding groove 911 is provided on the limiting block 91 in the central axis direction of the screw rod 5. A first end of the limiting plate 92 is located in the sliding groove 911, and a second end of the limiting plate 92 is provided with a first through hole 921. The first through hole 921 has internal threads, through which the first through hole 921 is engaged with the screw rod 5, and the second end of the limiting plate 92 is clamped on the limiting part 53 through the first through hole. Specifically, the second end of the limiting plate 92 is sleeved on the limiting part 53 through the first through hole.

When one end of the transmission component 4 moves to the limiting part 53 of the screw rod 5, the second end of the limiting plate 92 is pushed out of the limiting part 53, and the limiting plate 92 is driven by the screw rod 5 to move in the first direction. When the control mechanism 7 controls the transmission component 4 through the screw rod 5 to move in the second direction opposite to the first direction, the limiting plate 92 is driven to move in the second direction. When the limiting plate 92 is moved to the limiting part 53, one end of the transmission component 4 is pushed out of the limiting part 53, and the transmission component 4 is driven by the screw rod 5 to move in the second direction, so that the camera module 1 extending protruding from the terminal can be retracted into the terminal.

Figure 5:
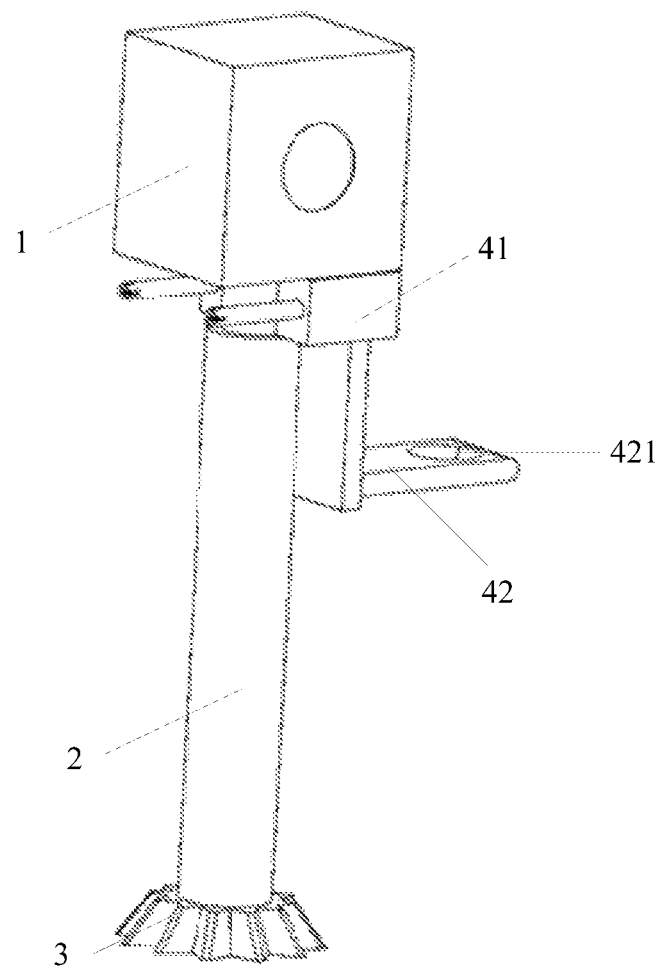
FIG. 5 is a schematic structural diagram of a transmission component in a camera apparatus according to an embodiment of this disclosure.

Further, as shown in FIG. 5, the transmission component 4 includes:

a first fixing plate 41 provided with a second through hole, where the first fixing plate 41 is sleeved on the rotating shaft 2 through the second through hole; and a second fixing plate 42 connected to the first fixing plate 41 and provided with a third through hole 421, where the second fixing plate 42 is sleeved on the screw rod 5 through the third through hole 421 and is rotatably connected to the screw rod 5.

The first fixing plate 41 and the second fixing plate 42 are arranged in parallel and located on different planes, and the first fixing plate 41 and the second fixing plate 42 are connected through a connecting plate.

The third through hole 421 has internal threads, through which the third through hole 421 is engaged with the screw rod 5.

Specifically, the first fixing plate 41 includes:

a first fixing part and a second fixing part (only a part is shown in FIG. 5) that have a same structure, where the first fixing part and the second fixing part each include a semi-circular through hole, the semicircular through hole is clamped on the rotating shaft, and the first fixing part and the second fixing part are connected to form the second through hole. The first fixing part and the second fixing part are connected through a bolt.

The first fixing plate 41 is formed by buckling two parts and is secured by a bolt, which can restrict movement of the camera module 1, the rotating shaft 2 and the first gear 3 in a direction parallel to the central axis direction of the screw rod.

Figure 6:
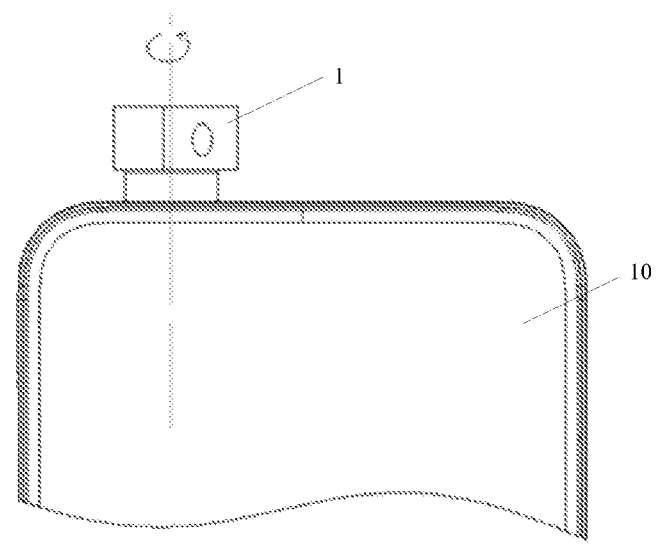
FIG. 6 is a schematic diagram of a camera apparatus ejected from a housing of a terminal according to an embodiment of this disclosure.

The camera module in the embodiment of this disclosure may be arranged in an accommodating space of a housing of the terminal. When the camera module is in a non-shooting state, the camera module is located in the accommodating space, and the motor does not operate. After a shooting function is started, the motor drives the screw rod 5 to start rotating. In this state, the second fixing plate 42 of the transmission component 4 is driven by the screw rod 5 to move upward, that is, the camera module 1 starts to be ejected from the housing 10 of the terminal. At this moment, the limiting plate 92 of the limiting component 9 is located at a position of the limiting part 53 of the screw rod, and because this position has no threads, the limiting plate 92 stays at this position and does not move up or down. The second fixing plate 42 of the transmission component 4 reaches the limiting part 53 of the screw rod 5. In this case, as shown in FIG. 6, the camera module 1 is ejected. The second fixing plate 422 pushes the limiting plate 92 into an upper screw rod (a first part) during a process in which the second fixing plate 422 enters the limiting part 53. The first gear 3 and the second gear 6 are meshed with each other, and a camera module rotation function is started. The motor drives the screw rod 5 and the second gear 6 to rotate, and the second gear 6 drives the first gear 3 to rotate, thereby implementing rotation of the camera module 1. During this process, the second fixing plate 42 is located in the limiting part 53 of the screw rod 5 and does not drive the camera module to move up or down, and the limiting plate 92 is driven by the screw rod 5 to move upward.

When the camera rotation function is disabled, the motor rotates reversely to drive the limiting plate 92 to move downward, the limiting plate 92 enters the limiting part 53 of the screw rod, and the limiting plate 92 no longer moves up or down. The limiting plate 92 pushes the second fixing plate 42 into a lower screw rod (a second part), and movement of the second fixing plate 42 drives the camera module to move downward, which is a retraction process of the camera module 1. The camera module 1 is moved down to a set value to complete the retraction of the camera module 1.

It should be noted that the rotation of the rotating shaft may alternatively be not implemented by using the first gear and the second gear. To be specific, the first gear and the second gear are not disposed, and the rotation of the rotating shaft is controlled by using a separate motor.

According to the camera apparatus in the embodiment of this disclosure, the control mechanism drives the screw rod to rotate, and when the screw rod rotates, the transmission component is driven to move in the central axis direction of the screw rod, so that the camera module can protrude from the terminal. In addition, the screw rod rotates to drive the transmission component to move in the central axis direction, and when the transmission component moves to the predetermined position, the first gear meshes with the second gear to drive the camera module to rotate, so that the camera module can automatically rotate after protruding from the terminal.

An embodiment of this disclosure provides a terminal, where a housing of the terminal is provided with an accommodating space, the terminal further includes the camera apparatus as describe above, and the camera apparatus is arranged in the accommodating space. All implementations of the foregoing camera apparatus are applicable to the terminal and a same technical effect can be achieved.

The terminal in the embodiment of this disclosure includes a terminal formed by components such as a radio frequency unit, a network module, an audio output unit, an input unit, a sensor, a display unit, a user input unit, an interface unit, a memory, a processor, and a power supply.

The terminal in the embodiment of this disclosure may be a mobile phone, a tablet computer, a personal digital assistant, an in-vehicle computer, a music player, a laptop computer, or a navigator.

All embodiments in this specification are described in a progressive manner. Each embodiment focuses on what is different from other embodiments. For same or similar parts in the embodiments, mutual reference may be made.

Although some optional embodiments in the embodiments of this disclosure have been described, persons skilled in the art can make changes and modifications to these embodiments once they learn the basic inventive concept. Therefore, the following claims are intended to be construed as to cover optional embodiments and all changes and modifications falling within the scope of the embodiments of this disclosure.

Finally, it should be noted that in this specification, relationship terms such as "first" and "second" are merely used to distinguish one entity or operation from another, and do not necessarily require or imply that any actual relationship or sequence exists between these entities or operations. Moreover, the terms "include", "comprise", or their any other variants are intended to cover a non-exclusive inclusion, so that a process, a method, an article, or a terminal device that includes a list of elements not only includes those elements but also includes other elements that are not listed, or further includes elements inherent to such a process, method, article, or terminal device. Without more limitations, elements defined by a sentence "include a . . . " do not exclude that a process, method, article or terminal device including the elements also include other identical elements.

The foregoing descriptions are merely optional embodiments of this disclosure, but are not intended to limit this disclosure. Any modification, equivalent replacement, or improvement made without departing from the spirit and principle of this disclosure shall fall within the protection scope of this disclosure.

What is claimed is:

1. A camera apparatus, comprising:
   a camera module;
   a rotating shaft fixedly connected to the camera module, wherein a first gear is fixed at one end, away from the camera module, of the rotating shaft;
   a transmission component fixed on the rotating shaft and abutting against the camera module;
   a screw rod rotatably connected to the transmission component, wherein a second gear is fixed on the screw rod, and the screw rod is arranged in parallel with the rotating shaft; and
   a control mechanism connected to the screw rod, wherein the control mechanism drives the screw rod to rotate, the screw rod rotates to drive the transmission component to move in a central axis direction of the rotating shaft, and when the transmission component moves to a predetermined position, the first gear meshes with the second gear to drive the camera module to rotate.

2. The camera apparatus according to claim 1, wherein the screw rod comprises:
   a first part, a second part, and a limiting part located between the first part and the second part, wherein
   the first part and the second part each are a rod-shaped structure with threads on its surface, and the limiting part is a rod-shaped structure without threads on its surface.

3. The camera apparatus according to claim 2, wherein a diameter of the limiting part is smaller than a diameter of the first part and a diameter the second part.

4. The camera apparatus according to claim 2, further comprising:
   a frame fixedly connected to the screw rod, wherein a limiting component is arranged on the frame, and the limiting component is clamped on the limiting part.

5. The camera apparatus according to claim 4, wherein the limiting component comprises a limiting block and a limiting plate, wherein
   the limiting block is fixedly connected to the frame, and a sliding groove is provided on the limiting block in the central axis direction of the screw rod, and a first end of the limiting plate is located in the sliding groove, a second end of the limiting plate is provided with a first through hole, and the second end of the limiting plate is clamped on the limiting part through the first through hole.

6. The camera apparatus according to claim 1, wherein the transmission component comprises:
   a first fixing plate provided with a second through hole, wherein the first fixing plate is sleeved on the rotating shaft through the second through hole; and
   a second fixing plate connected to the first fixing plate and provided with a third through hole, wherein the second fixing plate is sleeved on the screw rod through the third through hole; and
   the first fixing plate and the second fixing plate are arranged in parallel and located on different planes.

7. The camera apparatus according to claim 6, wherein the first fixing plate comprises:
   a first fixing part and a second fixing part that have a same structure, wherein the first fixing part and the second fixing part each comprise a semicircular through hole, and the first fixing part and the second fixing part are connected to form the second through hole.

8. The camera apparatus according to claim 7, wherein the first fixing part and the second fixing part are connected through a bolt.

9. The camera apparatus according to claim 1, wherein the control mechanism comprises a motor and a decelerator.

10. A terminal, wherein a housing of the terminal is provided with an accommodating space, the terminal further comprises a camera apparatus, and the camera apparatus is arranged in the accommodating space;
    the camera apparatus comprises:
    a camera module;
    a rotating shaft fixedly connected to the camera module, wherein a first gear is fixed at one end, away from the camera module, of the rotating shaft;
    a transmission component fixed on the rotating shaft and abutting against the camera module;
    a screw rod rotatably connected to the transmission component, wherein a second gear is fixed on the screw rod, and the screw rod is arranged in parallel with the rotating shaft; and
    a control mechanism connected to the screw rod, wherein the control mechanism drives the screw rod to rotate, the screw rod rotates to drive the transmission component to move in a central axis direction of the rotating shaft, and when the transmission component moves to a predetermined position, the first gear meshes with the second gear to drive the camera module to rotate.

11. The terminal according to claim 10, wherein the screw rod comprises:
    a first part, a second part, and a limiting part located between the first part and the second part, wherein
    the first part and the second part each are a rod-shaped structure with threads on its surface, and the limiting part is a rod-shaped structure without threads on its surface.

12. The terminal according to claim 11, wherein a diameter of the limiting part is smaller than a diameter of the first part and a diameter the second part.

13. The terminal according to claim 11, wherein the camera apparatus further comprises:
    a frame fixedly connected to the screw rod, wherein a limiting component is arranged on the frame, and the limiting component is clamped on the limiting part.

14. The terminal according to claim 13, wherein the limiting component comprises a limiting block and a limiting plate, wherein
    the limiting block is fixedly connected to the frame, and a sliding groove is provided on the limiting block in the central axis direction of the screw rod, and a first end of the limiting plate is located in the sliding groove, a second end of the limiting plate is provided with a first through hole, and the second end of the limiting plate is clamped on the limiting part through the first through hole.

15. The terminal according to claim 10, wherein the transmission component comprises:
    a first fixing plate provided with a second through hole, wherein the first fixing plate is sleeved on the rotating shaft through the second through hole; and
    a second fixing plate connected to the first fixing plate and provided with a third through hole, wherein the second fixing plate is sleeved on the screw rod through the third through hole; and the first fixing plate and the second fixing plate are arranged in parallel and located on different planes.

16. The terminal according to claim 15, wherein the first fixing plate comprises:

a first fixing part and a second fixing part that have a same structure, wherein the first fixing part and the second fixing part each comprise a semicircular through hole, and the first fixing part and the second fixing part are connected to form the second through hole.

17. The terminal according to claim 16, wherein the first fixing part and the second fixing part are connected through a bolt.

18. The terminal according to claim 10, wherein the control mechanism comprises a motor and a decelerator.

* * * * *